Oct. 21, 1969  E. A. REPKA  3,473,627
PORTABLE TOWER
Filed Dec. 15, 1967  2 Sheets-Sheet 1
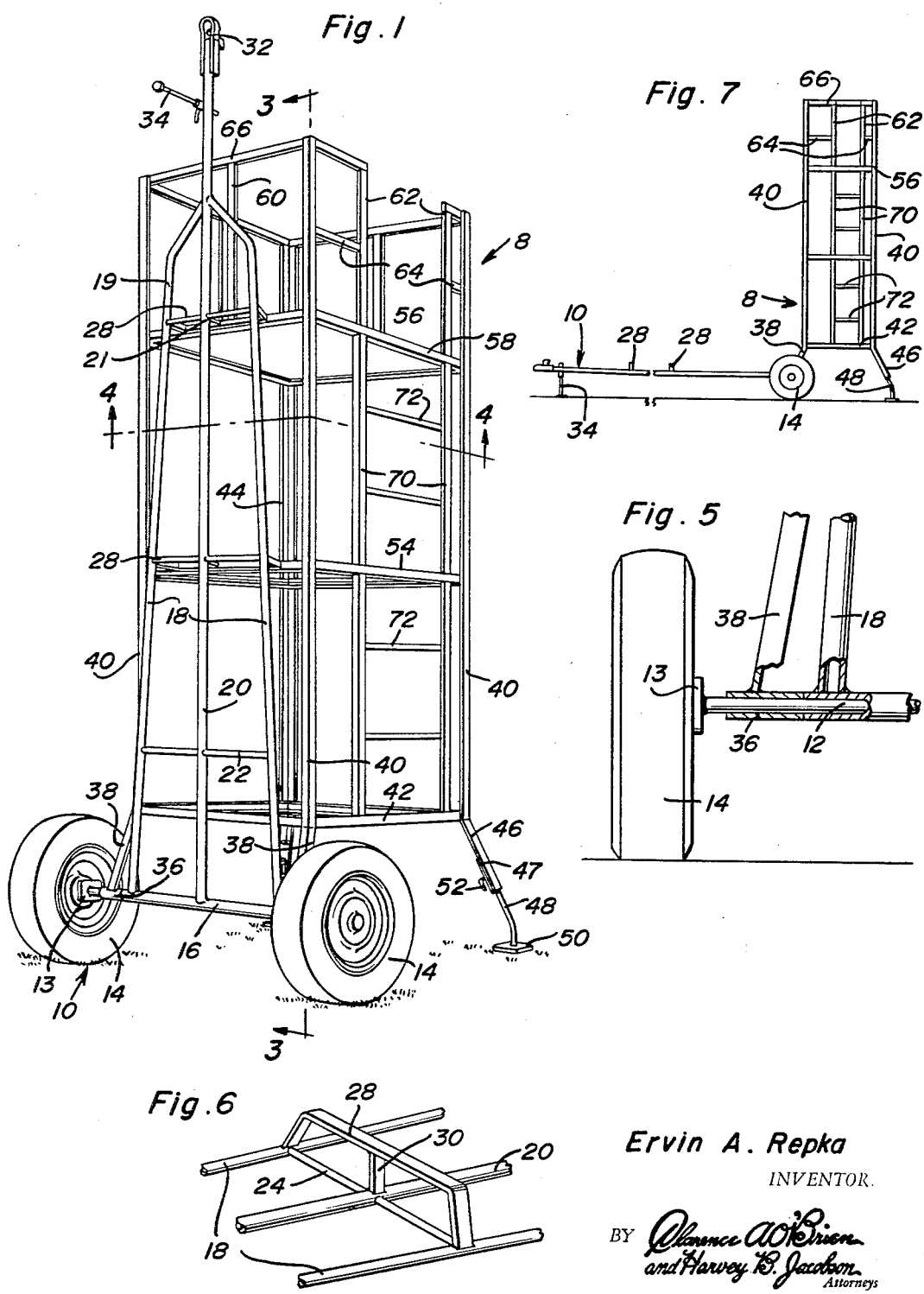
Ervin A. Repka
INVENTOR.

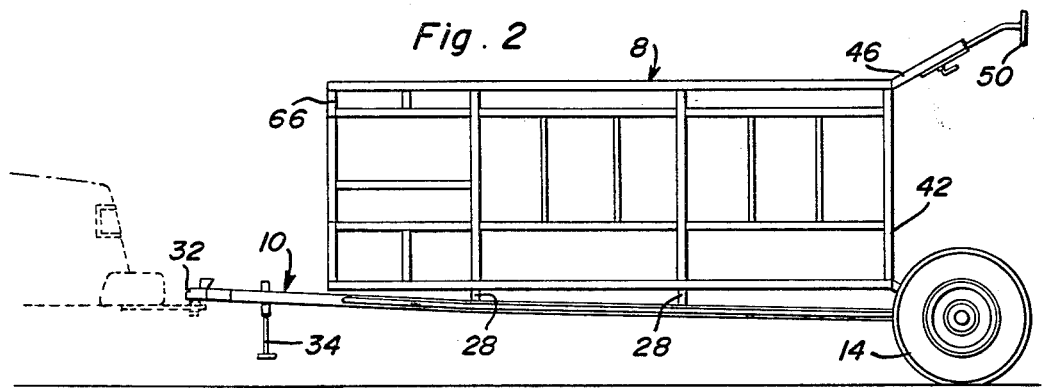
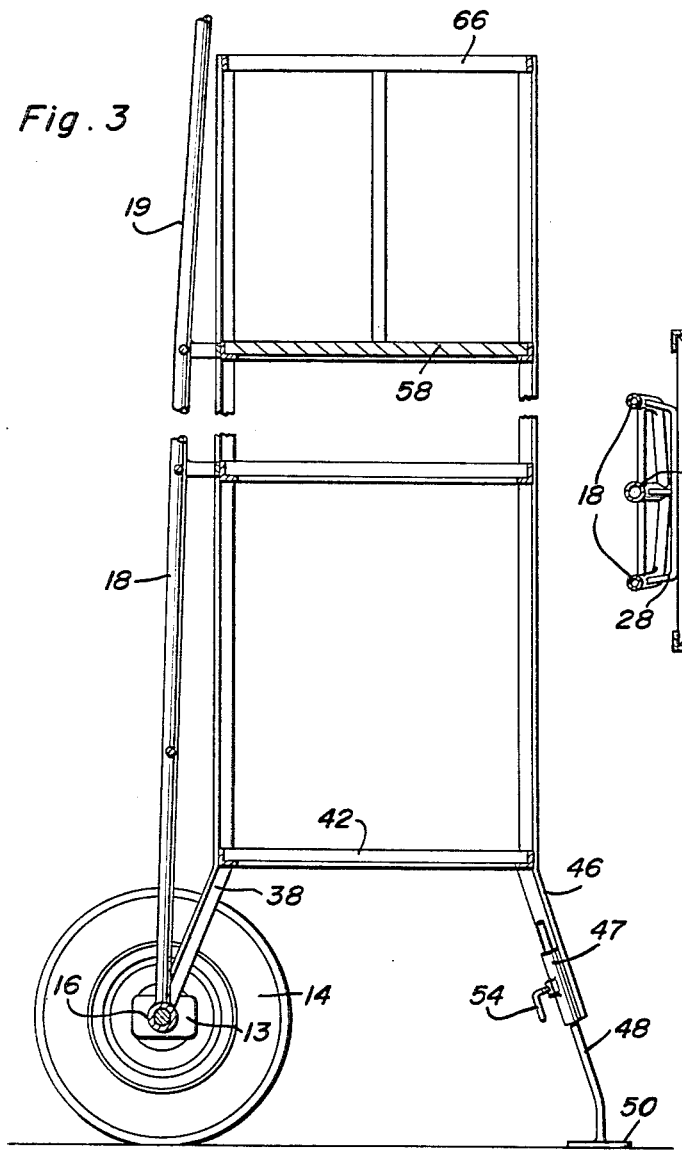
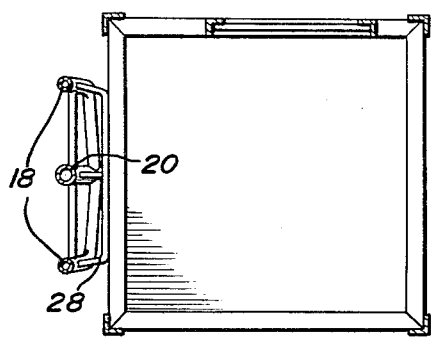

United States Patent Office
3,473,627
Patented Oct. 21, 1969

3,473,627
PORTABLE TOWER
Ervin A. Repka, 117 W. Ligustrum,
Robstown, Tex. 78380
Filed Dec. 15, 1967, Ser. No. 690,848
Int. Cl. E06c *1/39;* E04g *1/00*
U.S. Cl. 182—16                                8 Claims

ABSTRACT OF THE DISCLOSURE

A scaffold frame is pivotally mounted upon the axle of a trailer assembly. The trailer assembly includes a framework member pivotally mounted upon the same axle. In transport, the scaffold is maintained in overlying relation with the trailer, the latter being normally hitched to the rear end of an automotive vehicle. Upon arrival at a selected location, the scaffold is manually rotated upwardly from the trailer and positioned in an upright manner. Adjustable leg assemblies assist in stabilizing the scaffold in the upright position.

---

The present invention relates to the field of framework structures and more particularly to portable, mobile framework structures.

The prior art includes mobile ladder assemblies which are normally positioned in overlying relation with a trailer. Upon arrival at a work area, the ladder is pivotally rotated to an upstanding position enabling a workman to proceed with his task. These previous devices have limited usefulness due to the fact that the ladder devices do not permit extended motion on a plane above the ground. Certain other prior art also includes detachable tower or scaffold assemblies which are transported in a "knocked down state" and assembled at the work site which is a time consuming operation accompanied by a commensurate economic loss in productivity.

In brief description of the present invention, a framework structure resembling a floored tower or scaffold is pivotally mounted upon the axle of a trailer. A ladder is affixed to the tower to permit access by a workman to a vertically disposed floor. Adjustable leg assemblies append downwardly from the base of the tower structure to stabilize the structure in an upright position. A second framework structure in the shape of an obelisk is also pivotally mounted upon the axle. This latter structure is utilized as a trailer for the tower when hitched to the rear end of an automotive vehicle. Normally, while in transport, the tower structure is retained in a downwardly overlying relation with the hitched trailer. However, when it is so desired, the structure is rotated upwardly to an upright position. The present invention permits an individual a greater freedom of movement on a floored construction vertically removed from the ground than has been available in prior mobile frameworks. The present tower structure is lightweight and may be rotated to an upstanding position by the manual efforts of one individual. Further, it may be used for many different purposes, such as hunting, scaffolding, or any other job that requires the vertical elevation of a workman. Accordingly, among the salient objects of the present invention are to provide:

A mobile tower;

A tower framework structure that can be freely moved to different locations, erected, used, lowered, and moved with ease and simplicity;

A transportable tower that may be erected manually;

A trailer framework for transporting a tower, the trailer being structure pivotally mounted upon an axle and capable of rotation about said axle to an abutting position against the tower when the tower is disposed in an upright position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the tower and trailer in an upright position.

FIGURE 2 is a front elevational view illustrating the trailer hitched to an automobile and the tower overlying the trailer.

FIGURE 3 is a fragmentary sectional view of the upright tower.

FIGURE 4 is a transverse view of the tower taken along a plane passing through section line 4—4 of FIGURE 1.

FIGURE 5 is a fragmentary transverse view illustrating the axle portion of the trailer.

FIGURE 6 is a fragmentary perspective view illustrating a support bracket for the tower when the latter is transported upon the trailer.

FIGURE 7 is a side elevational view of the erected tower, the trailer being disposed in the hitching position.

Referring specifically to the drawings, a preferred embodiment of the present invention is shown in FIGURES 1, 2 and 7, said embodiment being represented by the reference numeral 8. The embodiment so represented illustrates a portable tower or scaffold which is rotatably mounted upon a wheeled trailer generally denoted by reference numeral 10 as illustrated in FIGS. 1 and 7 in the drawings. In FIGURE 5, a spindle 13 is suitably attached to each end of an axle 12, each spindle providing a means for mounting a tire 14 thereon. This wheeled axle provides a facility for rolling the tower and trailer as well as permitting the rotation of these members about the axle as explained hereinafter.

FIGURE 1 illustrates the framework structure of the trailer which includes a pipe sleeve 16 disposed concentrically of the axis 12. A section of pipe tubing 18 extends from both ends of the sleeve 16 in a converging manner along an end portion opposite the sleeve 16 to form the shape of an obelisk. An intermediate length of the tubing 18 includes a bend in the vicinity inwardly of the obelisk peak as illustrated in FIGURES 2 and 3 of the drawings to maintain the central portion of the trailer lower to the ground when being transported. A centrally and longitudinally disposed pipe section 20 extends from the median of the pipe section 16 through the peak of the obelisk shape and extends outwardly therefrom for a hitching attachment to an automotive vehicle as explained hereinafter. The pipe section 20 includes a bend identical in angle to the bend 19 along a distance from the base pipe sleeve 16 equal to that distance in which the bend 19 occurs. Accordingly, the trailer may be characterized by two angularly disposed framework sections, each section being coplanar unto itself. A cross brace 22 is disposed along an intermediate length of the trailer, the cross brace being parallel to the pipe sleeve base 16 and in outward spaced relation thereto. A second cross-brace 24 is affixed to the trailer along an intermediate length thereof and disposed longitudinally outwardly of the cross-brace 22. This brace is most clearly shown in FIGURE 6 of the drawings in which it is seen that the cross-brace 24 is connected between the three longitudinal pipe sections of the trailer. An inverted generally W-shaped bracket 28 appends perpendicularly of the trailer pipe sections, the free arm ends of the W-shaped bracket being attached to corresponding pipe sections 18 of the trailer. The bight portion of the bracket is disposed parallel of the trailer in spaced relation thereto. The central arm 30 of the W-shaped bracket is connected between the bight portion of the same and the centrally disposed pipe section 20 of the trailer. The outward end of the central pipe section 20 receives a self-locking ball type hitch 32 welded or otherwise suitably attached thereto. An adjustable telescoping stand 34 of suitable design and fabrication is welded to the central pipe section 20 a point immediately inwardly of the hitch 32. FIGURE 2 illustrates the utilization of the hitch and adjustable stand when the trailer is connected with an automotive vehicle.

As seen in FIGS. 1 and 5 of the drawings, a pipe sleeve 36 is disposed concentrically of the axle 12 at each end of the pipe sleeve 16. A gusset frame section 38 is welded to the sleeve 36 at each end of the axle. These frame sections are disposed in an outward angular manner from the base of the tower at a point of connection with longitudinal angle iron members 40, the latter forming the longitudinal corner supports of the tower. A square cross brace assembly 42 is connected to each of the angle irons 40 and is disposed transversely thereof to form a base for the tower. As seen in FIGURES 1 and 3 of the drawings, a gusset frame section 46 appends in an outward angular manner from the base of the tower and more particularly from the two corners of the base not connected to the aforementioned gusset frame sections 38. A sleeve section 47 is welded to the gusset 46 and an angled rod 48 is disposed within the sleeve 47, the rod terminating outwardly in a steel plate pad 50 which is normally positioned against the ground surface for stabilizing the erected tower. A wing-type bolt 52 is provided through the sleeve 47 for locking the rod 48 within the sleeve 47.

An intermediate height of the tower includes a second square cross-brace assembly 54 similar to the cross-brace 42. Likewise, a third cross-brace assembly 56 is disposed vertically above the second square cross-brace assembly 54. This latter cross-brace assembly includes a wooden platform or floor 58 therein for permitting a workman to stand thereon. The W-shaped brackets 28 on the trailer are orientated to abut a confronting surface of each square cross-brace assembly 54 and 56 thereby maintaining the tower in a horizontal position when transported as shown in FIGURE 2. As shown in FIGURE 1, longitudinal flat iron braces 60 are connected to the cross-brace member 56 and extends outwardly therefrom along the cross-brace assembly sides in overlying spaced relation with the trailer framework when the latter is in confronting relation with the upright tower. Longitudinally disposed flat iron braces 62 append from one side of the upwardly disposed square cross brace assembly 56 these latter mentioned flat iron sections are utilized as ladder rails as explained hereinafter. Cross-brace sections 64 are connected between the aforementioned flat iron sections 62 and adjacently disposed angle iron sections 40. A substantially square shaped flat iron assembly 66 is connected to the topward free ends of the longitudinally disposed frame members 40, 60 and 62. The cross brace structure 66 is not connected between the longitudinally orientated flat iron sections 62 so that an entrance is formed to permit entry of a person onto the floor or platform 58.

As seen in FIGURE 1 of the drawings, the longitudinally disposed flat iron sections 62 continue downwardly to the platform 58 where they are connected thereto. Collinear with these sections and extending downwardly from the platform 58 are two longitudinal braces 70, each said brace being connected to the cross brace frame assemblies 54 and 42. Rods 72 are connected between these longitudinal braces thereby forming rungs which permit a person to climb the tower to the height of the platform.

In actual operation of the device, FIGURE 2 illustrates the utilization of the tower in its mobile state.

The trailer 10 provides support for the overlying tower structure 8. The trailer includes the wheels 14 at one end thereof and a hitch 32 at the opposite end connected to an automotive vehicle. After the tower is transported to a preselected site, the tower 8 is pivoted upwardly around the axle of the wheels 14 until it attains an upright position shown in FIGURE 7 of the drawings. The hitch 32 is then disconnected from the automotive vehicle and the trailer portion 10 is pivoted to an abutting relation with the upright tower as shown in FIGURE 1. It is to be appreciated that the trailer may be maintained in the downward grooved overlying position of FIGURE 7 if so desired.

Although FIGURES 1 and 5 illustrate the employment of sleeves mounted concentrically of the wheel axle for purposes of rotating the trailer and tower about the axle, it will be appreciated that alternate constructions of swiveling the trailer or tower from a bearing and spindle of the trailer axle, or removing the tower and independently supporting the same, lies within the purview of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel and axle assembly including trailer means adapted for towing by an automotive vehicle, tower means normally positioned in transportable overlying relation of said trailer means, means for supporting said tower in said overlying position, said tower means adapted for selective pivotal rotation around said axle to an upstanding operative position, means for supporting said tower in said upstanding position, said trailer means being capable of pivotal rotation around said axle to a position confronting said upstanding tower, said trailer means being characterized by a generally obelisk shaped frame structure, the peak portion of said structure being angled upwardly of the remaining structure, the base of said structure including a sleeve section adapted to be disposed concentrically of said trailer axle thereby permitting said aforementioned pivotal rotation of said trailer.

2. The assembly set forth in claim 1 wherein said tower is characterized by a generally polygonal frame structure, the base of said structure including a plurality of coaxial sleeve sections appending from one edge thereof and disposed concentrically of said axle thereby permitting said aforementioned pivotal rotation of said tower.

3. The assembly set forth in claim 1 wherein said means for supporting said tower in said overlying position include a plurality of generally W-shaped brackets, the arm ends of said brackets being fixedly attached to the upward side of said trailer structure, the bight portion of said bracket appending outwardly therefrom for overlying contact with a confronting side of said tower when said trailer structure is raised uprightly.

4. The assembly set forth in claim 3 wherein said means for supporting said tower in said upstanding position include a plurality of adjustably positionable leg assemblies appending outwardly of the base of said tower structure along the side of said structure opposite said confronting side.

5. The assembly set forth in claim 4 together with at least one platform construction affixed to said tower structure, said platform construction being transverse of said tower structure.

6. The assembly set forth in claim 5 together with an adjustable support appending outwardly and downwardly of said trailer structure for supporting same when unhitched from said automotive vehicle and disposed in spaced overlying relation of a ground surface.

7. The assembly set forth in claim 6 together with ladder means affixed to said tower structure for providing access to said platform from the ground.

8. A portable scaffold construction adapted for transportation on a wheeled vehicle, said construction being further adapted for pivotal rotation upwardly of an axle of said vehicle to an upstanding position, said scaffold including platform support means, ladder means for access to said platform support means and adjustable leg means for supporting said scaffold in an upright position.

References Cited

UNITED STATES PATENTS

| 328,943 | 10/1885 | Henderson et al. | 182—127 |
| 750,402 | 1/1904 | Sechler | 182—127 |
| 2,233,333 | 2/1941 | Wick | 182—16 |
| 3,156,317 | 11/1964 | Lundeen | 182—17 |
| 3,282,376 | 11/1966 | Merriman | 182—17 |

REINALDO P. MACHADO, Primary Examiner

U.S. Cl. X.R.

182—17, 179